United States Patent [19]
Haller et al.

[11] 3,782,595
[45] Jan. 1, 1974

[54] DISPENSING OF VISCOUS MATERIAL

[75] Inventors: Albert H. Haller, Clark, N.J.; John J. Larkin, Little Neck, N.Y.; Richard P. Walters, Watchung, N.J.

[73] Assignee: Western Electric Corporation, New York, N.Y.

[22] Filed: Sept. 7, 1971

[21] Appl. No.: 178,133

[52] U.S. Cl................ 222/1, 222/189, 222/196, 141/32, 136/67
[51] Int. Cl. .......................................... H01m 35/26
[58] Field of Search.................. 222/196, 189, 1; 141/32, 33; 136/67

[56] References Cited
UNITED STATES PATENTS

| | | | |
|---|---|---|---|
| 3,259,272 | 7/1966 | Larson | 222/196 X |
| 2,174,348 | 9/1939 | Damond | 222/196 |
| 3,333,537 | 8/1967 | Proskauer | 222/199 X |

*Primary Examiner*—Robert B. Reeves
*Assistant Examiner*—Frederick R. Handren
*Attorney*—W. M. Kain et al.

[57] ABSTRACT

A dispensing mechanism places a predetermined quantity of a highly viscous paste into successive articles, such as battery grids. A constant level of the paste is maintained in a cylindrical dispensing cup of the mechanism, which has a grid-like bottom formed of radially disposed wires. The paste flows out of the grid-like bottom of the cup during vibration of the cup. When the vibration stops, the flow of the paste through the wires also stops. Thus, a convenient mechanism is provided for controlling the amount of paste dispensed.

7 Claims, 12 Drawing Figures

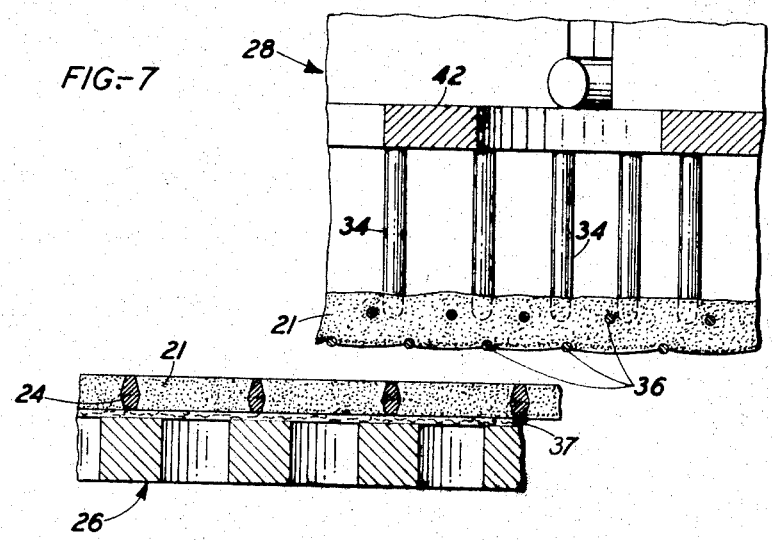
FIG.-7
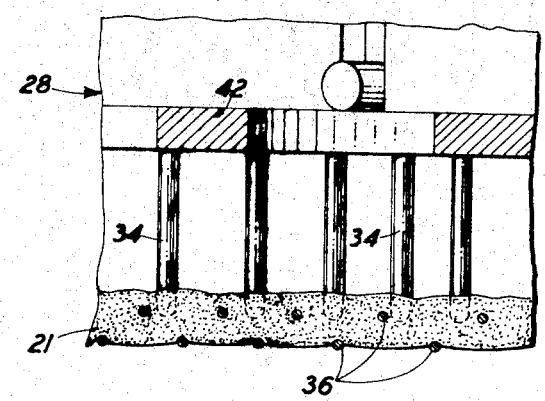
FIG.-8
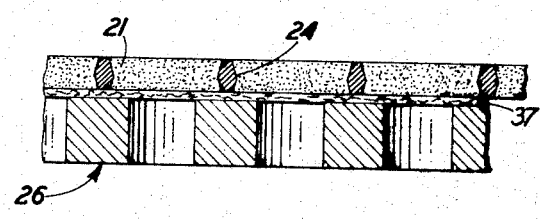

DISPENSING OF VISCOUS MATERIAL

BACKGROUND OF THE INVENTION

1. Field of the Invention

The invention relates to dispensing of material. More particularly, the invention relates to the dispensing of controlled quantities of viscous pasty material.

2. Description of the Prior Art

The introduction and development of cylindrical lead-acid batteries of the type described in U.S. Pat. No. 3,434,833, issued to L. D. Babusci et al. on Mar. 25, 1969, has resulted in a need for refined manufacturing techniques which have heretofore not been available. Previous designs of battery grids were quite amenable to conventional pasting techniques. However, the conical configuration of the battery grids illustrated in the subject patent results in a set of peculiar problems.

These problems are further complicated by the nature of the battery paste utilized in the subject cylindrical batteries. This paste, tetra-basic lead sulfate, is a highly successful material for purposes of contributing to long life of the cylindrical batteries. However, the paste is an extremely difficult substance to handle from a battery-manufacturing point of view.

It is desirable to place a precise amount of the paste onto a battery grid just prior to the time that the battery grid is subjected to a pasting operation of the sort which is described in patent application, Ser. No. 831,001, filed in the names of H. E. Durr and A. H. Haller on June 6, 1969 and assigned to the assignee of record of this application.

Obviously, a proper quantity of paste can be placed on the grids manually. But manual dispensing of paste is cumbersome and uneconomical and, therefore, undesirable in a well-designed manufacturing scheme.

Other conventional dispensing mechanisms are usually capable of placing only an undistributed glob of the paste material onto a grid. Such an undistributed quantity of material presents difficulties in the pasting operation disclosed in the aforementioned patent application.

SUMMARY OF THE INVENTION

It is, therefore, an object of this invention to efficiently dispense material.

It is another object of this invention to provide a system for dispensing a controlled quantity of viscous material onto an article.

It is a further object of the invention to accomplish such dispensing of a material in such a way that the material is uniformly distributed across the surface of the article.

These objects are achieved by holding a volume of the material in a hopper having a grid portion with openings therein small enough to preclude free flow of the material therethrough when the material is statically held in the hopper but with the openings large enough to permit flow of the material when the material is subjected to vibration.

The grid-like portion of the hopper is engaged with the article and the material is vibrated for a predetermined period of time. At the cessation of the vibration the hopper is rotated to shear away the material remaining in the hopper from the material which has been dispensed onto the article.

BRIEF DESCRIPTION OF THE DRAWINGS

Other objects and features of the present invention will be more readily understood from the following detailed description of specific embodiments thereof, when read in conjunction with the appended drawings in which:

FIGS. 4 through 8 are sectional views taken along the lines 4—4 of FIG. 3 illustrating a sequence of steps employed by the apparatus of FIG. 1 to accomplish a desired dispensing of material onto an article;

DETAILED DESCRIPTION

Illustratively, the invention is described in connection with dispensing viscous paste electrolyte onto battery grids. However, it is to be understood that this is only for purposes of explanation and that the invention has utility in dispensing various other materials.

Figure 1:
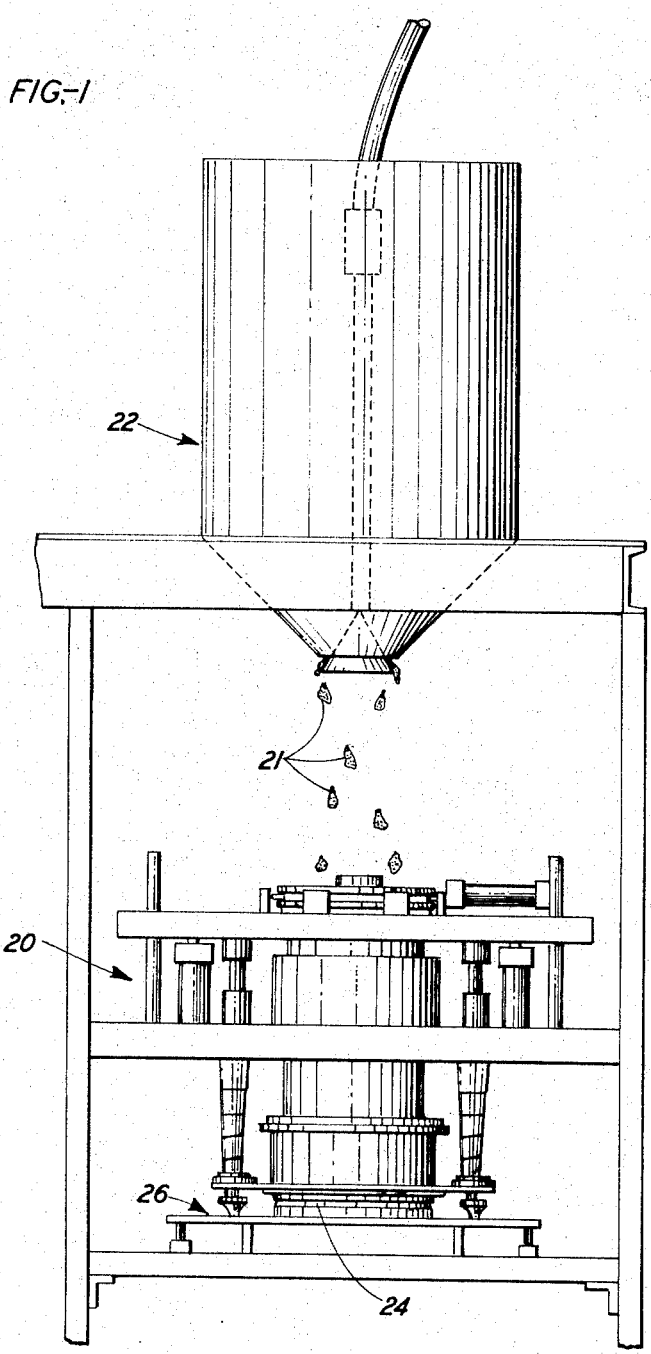
FIG. 1 is an overall elevational view of the inventive dispensing apparatus.

Referring now to FIG. 1 there is shown one embodiment of the invention, a dispensing machine, designated generally by the numeral 20. The machine 20 is positioned below a bulk feeder 22 which operates through a conventional level control system (not shown) to maintain a predetermined level of battery paste 21 within the dispensing machine 20. Battery grids 24 are successively indexed to a position beneath the dispensing machine 20 on a linear conveyor, designated generally by the numeral 26.

GENERAL OPERATION

Figure 2:
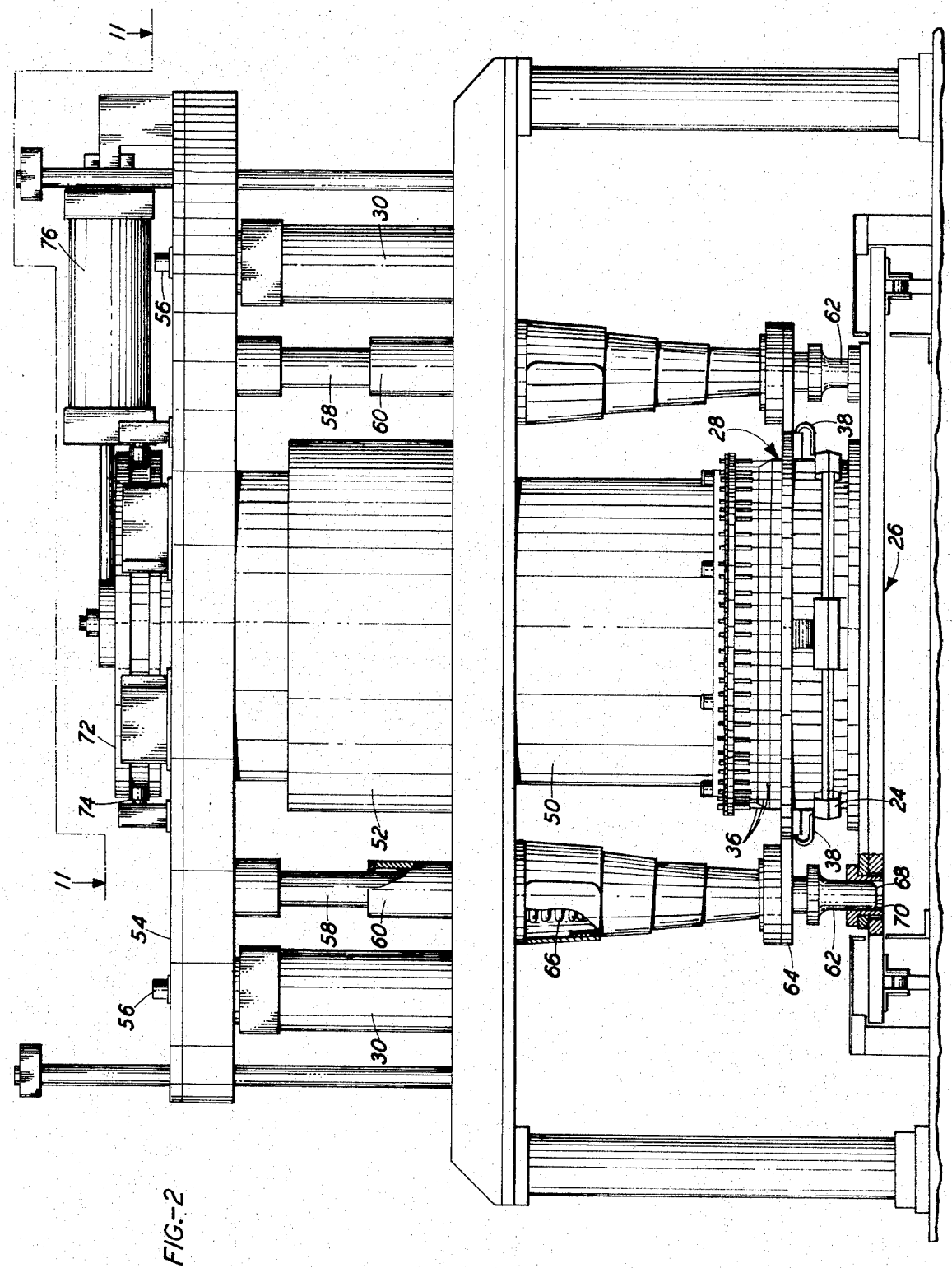
FIG. 2 is an elevational view, with various portions removed for purposes of clarity, illustrating the inventive dispensing apparatus of FIG. 1.
Figure 3:
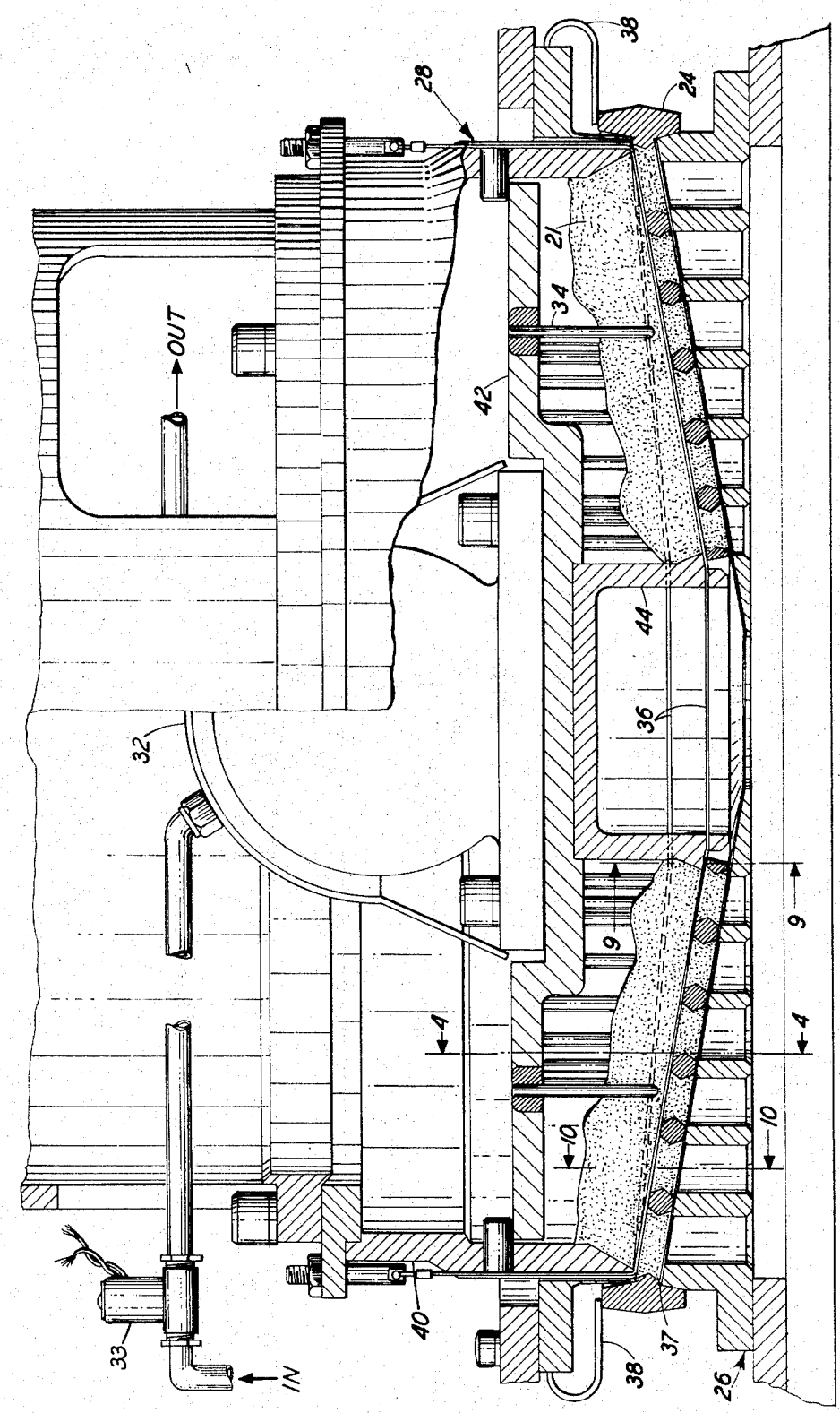
FIG. 3 is a view of a lower portion of the apparatus of FIG. 2 with additional portions removed for purposes of clarity.
Figure 4:
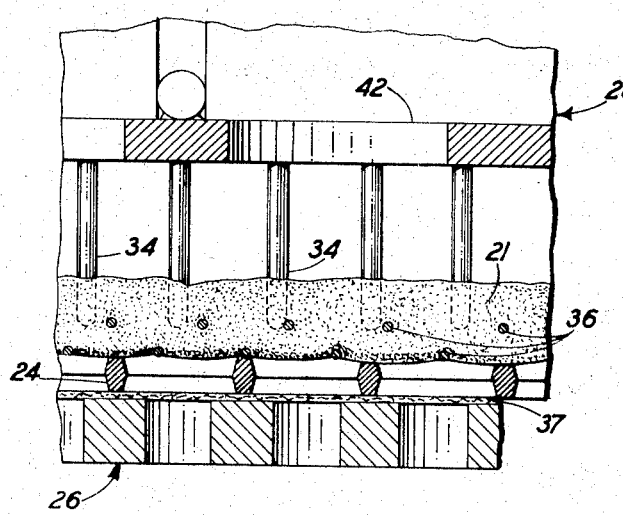
Figure 5:
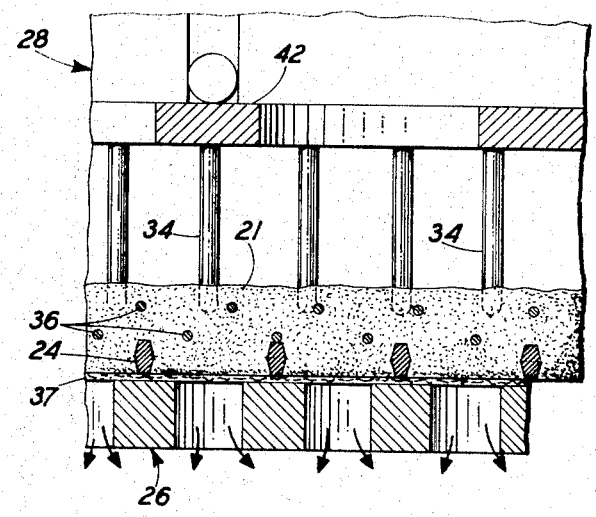

A cycle of operation begins when one of the grids 24 is positioned beneath the holder mechanism 20. A dispensing hopper or cup, designated generally by the numeral 28, containing the battery paste 21 is lowered into engagement with the grid 24, as shown in FIGS. 2, 3 and 4. After the cup 28 is engaged with the grid 24, a conventional pneumatic vibrator 32 (FIG. 3) is actuated with a valve 33. The vibrational energy of the vibrator 32 is principally coupled to the battery paste 21 through coupling rods 34. Vibratory energy is also introduced through the body of the cup 28. As the paste 21 is vibrated, it flows out, as shown in FIG. 5, between strand-like members or wires 36 which form a grid-like bottom for the cup 28.

The grid 24 is supported on the conveyor 26 with a layer of conventional filter paper 37 between the grid and the conveyor. The filter paper 37 permits air to be expelled out of the grid 24 and through holes in the conveyor 26 during the paste dispensing process.

Figure 6:
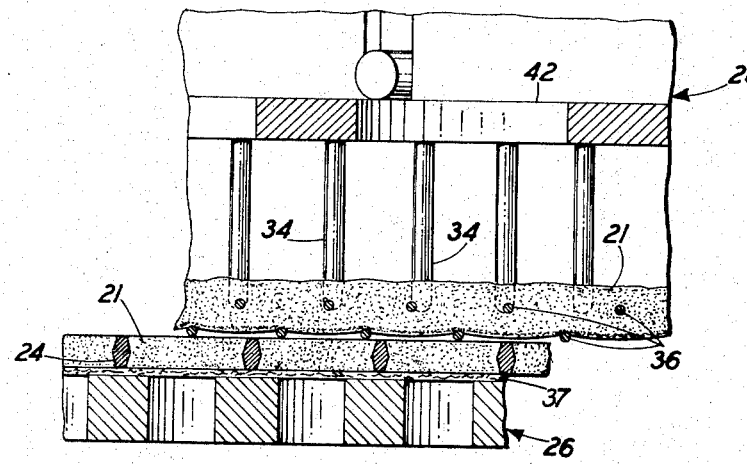

After a predetermined amount of time, the vibrator 32 is turned off and the flow of the paste 21 through the spaces between the wires 36 stops. The cup 28 is then rotated approximately 15°. As a result of the rotation, that portion of the paste 21 which is partially out of the cup 28 but not fully in the grid 24 is sheared by the wires 36. This shearing action is illustrated in FIG. 6.

After the shearing is completed, the cup 28 is raised away slightly from the surface of the grid 24, as shown in FIG. 7. Spring retaining members 38 (FIG. 1) remain in contact with the grid 24 assuring that the grid remains in place against the conveyor 26 during the initial lifting of the cup 28.

FIG. 8 illustrates the cup 28 lifted completely away from the grid 24 and the conveyor 26 thus representing a completion of a dispensing cycle. There is sufficient clearance between the cup 28 and the grid 24 to permit removal of the grid and replacement with a subsequent grid in anticipation of another dispensing cycle.

DISPENSING CUP DESIGN

The cup 28 (FIG. 2) is constructed of a cylindrical shell 40, and a vibrator support member 42, which is suspended by the wires 36 which are oriented radially from a center support member 44 to the shell 40. The spacing between the wires 36 is extremely important. The spacing must be sufficiently small so that the paste 21 does not flow between the wires when the cup is held in a static state. The wires 36, however, must be far enough apart so that when the vibrator 32 imparts vibrational energy to the paste 21 there results a desired flow of the paste through the wires.

It is also desirable to achieve substantially equal spacing between adjacent ones of the wires 36 across the entire bottom area of the cup 28. Such equality of spacing is achieved by arranging alternate ones of the wires 36 on two different planes.

Figure 9:
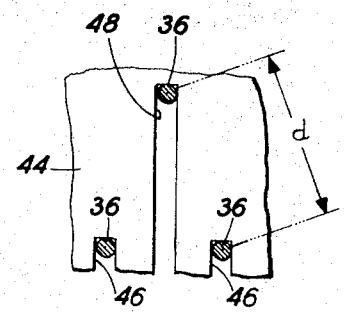
FIG. 9 is a sectional view taken along the lines 9—9 of FIG. 3 showing a desirable arrangement of wires forming a bottom of the apparatus of FIG. 2.
Figure 10:
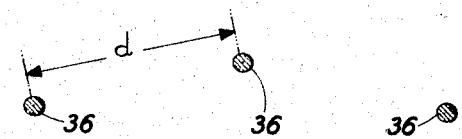
FIG. 10 is a sectional view taken along the lines 10—10 of FIG. 3 showing the wires of FIG. 9 at a location further from the center of the apparatus.

As shown in FIG. 9, the center support member 44 is provided with short slots 46 and long slots 48. The long and short slots alternate with one another around the support member 44. When FIG. 9 is compared with FIG. 10, it can be seen that a spacing $d$ between adjacent wires is substantially the same. Even though the lateral distance between the wires 36 is greater near the outer edge of the cup 28, the vertical distance between the wires diminishes near the edge. The net result of the changes in distance is balanced to achieve a zero effect on the critical dimension $d$. The dimension $d$ is, of course, representative of the space through which the paste 21 must flow. The paste 21, therefore, flows out of the cup 28 at substantially the same rate across the entire bottom area of the cup.

By way of example, it has been found that a cup having an inside diameter of approximately 11 inches and a paste level of approximately one inch will properly dispense battery paste, such as tetra-basic lead sulfate ($4PbO-PbSO_4$) onto battery grids of the type described in U.S. Pat. No. 3,434,883 issued to L. D. Babusci et al. on Mar. 25, 1969. In the particular exemplary dispensing cup, the bottom of the cup was formed of 64 wires having a diameter of 0.030 inch. The difference in length between the short slots 46 and the long slots 48 was approximately 0.375 inch and the center member 44 had a three inch diameter.

Vibrating the cup 28 at a frequency of approximately 10,000 cycles/minute for a period of ten seconds was sufficient to dispense 21 cubic inches of the paste 21.

VERTICAL MOVEMENT OF DISPENSING CUP

FIG. 2 illustrates a desirable mechanical arrangement for moving the cup 28 vertically to alternately engage and disengage the cup with successive ones of the grids 24. The cup 28 is mounted to the end of a support sleeve 50. The sleeve 50 is arranged to move slideably and rotatably within a bearing unit 52. A top end of the sleeve 50 is connected to a cylinder actuation plate 54. The plate 54 is, of course, connected to the piston rod 56 of the cylinders 30.

Also engaged with the plate 54 are two alignment rods 58. The alignment rods are arranged to move slideably through alignment bearing assemblies 60. At the lower end of each of the rods 58 there is provided a locator plug 62.

A spring supporting plate 64 is slideably engaged with the alignment rods 58. The plate 64 is spring biased away from the bearing assemblies 60 with compression springs 66. The plate 64 is utilized to support the springs 38 which hold the grid 24 in intimate contact with the conveyor 26.

When the cup assembly 28 is lowered, the plugs 62 at the ends of the rods 58 are the first components to engage with the conveyor 26. The plugs are provided with tapered ends 68 which enter alignment holes 70 on the conveyor 26. This assures that the grid 24 is precisely located on the center line of the cup 28.

As downward motion continues, the springs 38 mounted on the plate 64 become engaged with the grid 24 thus clamping the grid firmly against the conveyor 26. Further downward motion begins compressing the springs 66 and permitting relative motion between the cup 28 and the plate 64 which effectively results in the cup being intimately engaged with the grid 24.

During disengaging motion, the cup 28 and the alignment rods 58 are raised by the cylinders 30 until the locator plug 62 becomes engaged with the plate 64. After such engagement the plate 64 is also carried upwardly with the cup 28.

SHEARING AND DISENGAGEMENT MECHANISM

Figure 11:
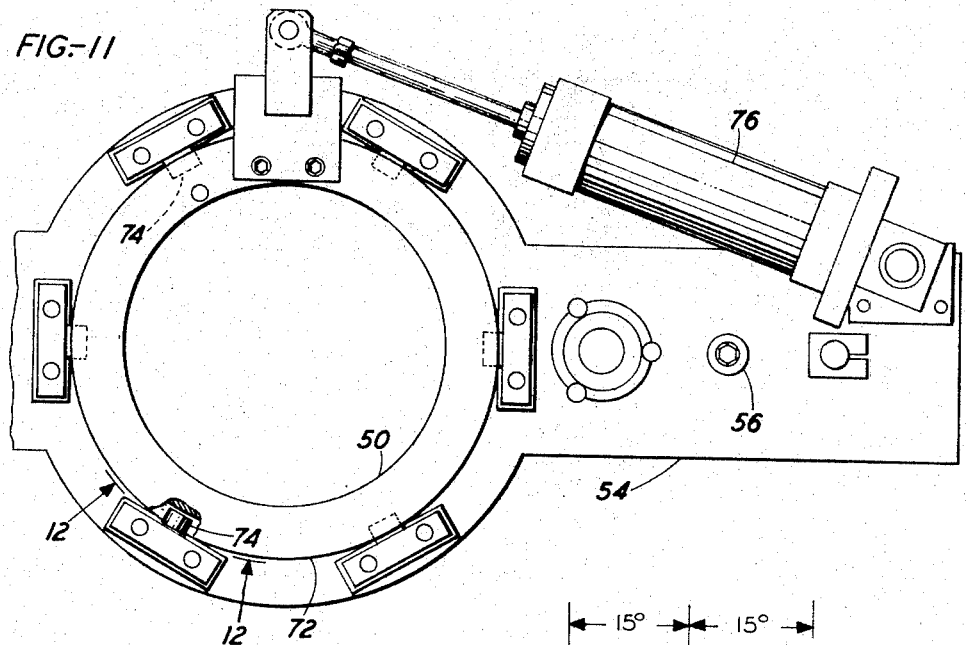
FIG. 11 is a sectional view of the apparatus of FIG. 2 taken along the line 11—11 showing a rotating mechanism.
Figure 12:
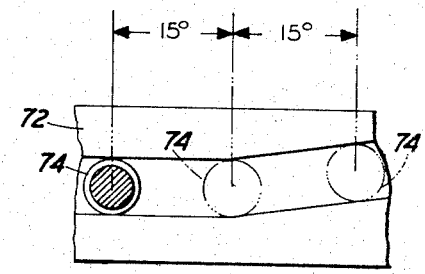
FIG. 12 is an illustration of a cam profile taken along the lines 12—12 of FIG. 11.

Referring now to FIGS. 11, 12 and the upper portion of FIG. 2, there is illustrated a mechanism by which the shearing and initial disengagement steps of FIGS. 6 and 7 are accomplished. The sleeve 50 is provided with a cam ring 72 at the top end thereof. The cam ring 72 is held to the plate 54 by a plurality of cam followers 74. A cylinder 76 is mounted on the plate 54 in such a way that actuation of the cylinder causes rotation of the cam ring 72 and the connected sleeve 50 and cup 28.

When it is desired to shear the paste 21 and initially disengage the cup 28 from the grid 24, the cylinder 76 is actuated. The cam ring 72 is provided with slot profiles therein which are illustrated in FIG. 12. During 15° of rotation of the ring, the cup 28 retains its engaged vertical position and simple shearing takes place as shown in FIG. 6. During a subsequent 15° of rotation, the cam ring 72 is lifted at a uniform rate to a distance of approximately one-fourth inch as shown in FIG. 7. The combined shearing and initial lifting are suitable to disengage the cup 28 cleanly from the grid 24 into which paste 21 has been dispensed.

It should be noted that throughout the shearing and lifting caused by the actuation of the cylinder 76, there is no motion of the plate 64 which holds the springs 38 down against the grid 24. Thus, there is no tendency for the grid 24 to rise up with the cup 28.

Although certain embodiments of the invention have been shown in the drawings and described in the specification, it is to be understood that the invention is not limited thereto, is capable of modification and can be arranged without departing from the spirit and scope of the invention.

What is claimed is:

1. Apparatus for dispensing material, which comprises:
    a holder for the material, said holder having openings therein formed by a plurality of strand-like members, the openings being small enough to preclude the free flow of the material therethrough when the material is statically held, but with said openings being large enough to permit the flow of said material therethrough when vibratory energy is applied to the material;
    means for applying vibratory energy to the material to flow the material through the openings; and
    means, operable at the cessation of the vibratory energy, for moving the holder relative to the material that has flowed through the openings to shear such flowed material.

2. The apparatus of claim 1, wherein the holder is cylindrical and the openings are formed by the strand-like members being radially oriented.

3. Apparatus for dispensing viscous material, which comprises:
    a hopper for the viscous material, said hopper having a grid bottom with openings therein formed by a plurality of wires disposed in at least two different planes, the openings being small enough to preclude the free flow of the material therethrough when the material is statically held in the hopper, but with said openings being large enough to permit the flow of said material therethrough when the material is subjected to vibration;
    means for vibrating the material to flow the material through the openings of the grid bottom of the hopper; and
    means, operable at the cessation of the vibration, for moving the grid bottom relative to the material that has flowed through the openings to shear such flowed material.

4. The apparatus of claim 3 wherein the vibrating means is coupled to the viscous material with rods that extend into the material internally of the hopper.

5. The apparatus of claim 3 wherein the hopper is cylindrical and the wires are radially oriented and spaced so that the distance between the wires is substantially the same across the entire area of the bottom.

6. A method of dispensing a material comprising the steps of:
    holding a quantity of the material in a hopper having openings therein formed by a plurality of strand-like members in at least two different planes, the openings being small enough to preclude the free flow of the material therethrough;
    applying vibratory energy to the material to flow it through the openings in the hopper; and
    moving the hopper, after the cessation of the vibratory energy, to move the strand-like members relative to the material that has flowed through the openings to shear such flowed material.

7. The apparatus of claim 3, wherein the moving means rotate the hopper about an axis extending perpendicularly through the grid bottom to cause the wires to shear away the material that has flowed through the openings.

* * * * *